United States Patent [19]

Abraham et al.

[11] Patent Number: 4,799,061
[45] Date of Patent: Jan. 17, 1989

[54] SECURE COMPONENT AUTHENTICATION SYSTEM

[75] Inventors: Dennis G. Abraham; Glen P. Double, both of Concord; Steven W. Neckyfarow, Matthews, all of N.C.

[73] Assignee: International Business Machines Corporation, Armonk, N.Y.

[21] Appl. No.: 799,367

[22] Filed: Nov. 18, 1985

[51] Int. Cl.$^4$ .......................... G07D 7/00; H04K 1/00; H04L 9/00
[52] U.S. Cl. .............................. 340/825.34; 340/825.3; 380/23; 380/24; 235/379
[58] Field of Search ........... 340/825.34, 825.3, 825.31, 340/825.33; 235/379, 380; 178/22.08, 22.09; 375/2.1; 380/23, 24, 25

[56] References Cited

U.S. PATENT DOCUMENTS

| | | | |
|---|---|---|---|
| 4,193,131 | 3/1980 | Lennon et al. | 375/2 |
| 4,203,166 | 5/1980 | Ehrsam et al. | 375/2 |
| 4,211,919 | 7/1980 | Ugon | 235/487 |
| 4,218,738 | 8/1980 | Matyas et al. | 364/200 |
| 4,227,253 | 10/1980 | Ehrsam et al. | 375/2 |
| 4,238,853 | 12/1980 | Ehrsam et al. | 375/2 |
| 4,238,854 | 12/1980 | Ehrsam et al. | 375/2 |
| 4,259,720 | 3/1981 | Campbell | 364/200 |
| 4,295,039 | 10/1981 | Stuckert | 235/380 |
| 4,349,695 | 9/1982 | Morgan et al. | 178/22.09 |
| 4,393,269 | 7/1983 | Konheim | 178/22.08 |
| 4,453,074 | 6/1984 | Weinstein | 235/379 |
| 4,467,139 | 8/1984 | Mollier | 178/22.08 |
| 4,471,216 | 9/1984 | Herve | 235/380 |
| 4,536,647 | 8/1985 | Atalla et al. | 235/379 |
| 4,549,075 | 10/1985 | Saada et al. | 235/380 |
| 4,612,413 | 9/1986 | Robert et al. | 178/22.08 |
| 4,665,396 | 5/1987 | Dieleman | 380/23 |

FOREIGN PATENT DOCUMENTS 1191916  8/1985  Canada ................................. 380/23

OTHER PUBLICATIONS

*Cryptography: A Primer;* Alan G. Konheim; 1981; pp. 331–347.

*Primary Examiner*—Robert L. Griffin
*Assistant Examiner*—Ralph E. Smith
*Attorney, Agent, or Firm*—Kenneth A. Seaman; Mitchell S. Bigel

[57] ABSTRACT

A system for authenticating components in a communications system using cryptographic techniques to determine if each has the proper key without disclosing information which would be useful to an imposter in deriving the key. A random number generated at a first terminal is encrypted under its key for transmission as a first value to a second terminal whose identity is to be authenticated. The second terminal decrypts the transmitted first value using its key deriving a second value (which equals the random number if the keys are identical.) The second terminal then encrypts its key using the second value as the key, generating a third value which is transmitted back to the first terminal for verification. The first terminal then verifies the third value, either by decrypting it using the random number as the key to obtain its key or by encrypting its key using the random number as key to derive the third number (if the two keys are identical.) Optionally, roles of the two terminals are then reversed after the second terminal has been identified, allowing the second terminal to authenticate the first terminal.

9 Claims, 2 Drawing Sheets

SECURE COMPONENT AUTHENTICATION SYSTEM

BACKGROUND OF THE INVENTION

The present invention relates to improvements in methods and systems for authenticating the hardware or components of a communication system. More particularly, the present invention relates to improvements useful in a cryptographic communication system between components or terminals which may be located at spatially separated locations.

Terminal to terminal communication is expanding both in terms of volume and in terms of importance. This communication occurs for various purposes, such as electronic funds transfers and for the transfer of credits in merchandising situations. One component which is assuming increased presence and importance in such systems is a "memory" card or a "smart" card, which includes memory, a processor and an input/output device mounted on a portable unit approximately the size of a credit card. Examples of such systems using the so called "memory" cards or "smart" cards shown in U.S. Pat. No. 3,702,464 to Castrucci, U.S. Pat. No. 4,007,355 to Moreno and U.S. Pat. No. 4,211,919 to Ugon.

Communication between terminals of systems frequently occurs without the human supervision of a system operator. This occurs either because at least a part of the communication is occurring at a remote location in which communication, occurs over a telecommunication facility (a telephone line or via radio waves or satellite, for example) or because labor-saving measures are being used (e.g., automatic teller machines placed in a bank lobby to off-load some teller labor which would otherwise be required.)

A variety of systems for insuring security of communications have been suggested. Some include a challenge and password arrangement, and some of these involved the use of a random number as a challenge. These security systems generally divulge some useful or secret information to a terminal before the terminal has been identified as friendly, as opposed to hostile (e.g., an impostor.) It is undesirable to provide such information before the identity is established, since the distribution of such information can lead to the penetration of the system by unauthorized terminals, presumably operated by unauthorized personnel or in unauthorized modes (removing cash from someone else's account, for example). Examples of such security systems are shown in U.S. Pat. Nos. 3,798,605; 4,123,747; 4,193,131; 4,203,166; 4,218,738; 4,227,253; 4,238,853; 4,238,854; 4,259,720; 4,288,659; 4,295,039; 4,393,269; 4,423,287; 4,453,074; and 4,471,216.

Other limitations and disadvantages of the prior art terminal security systems will be apparent to those skilled in this art in view of the following detailed description of the best mode of carrying out the present invention, taken in conjunction with the appended claims and the accompanying drawings.

SUMMARY OF THE INVENTION

The present invention overcomes the limitations and disadvantages of the prior art systems by providing a system for securely identifying or authenticating the components of a communications system prior to communicating any useful information. In this manner, an "impostor" (unauthorized) terminal is identified and communication ceases before any information is passed which might be useful (perhaps in combination with information gained in other failed attacks) to gain unauthorized recognition and access to the system.

The present invention is a communication challenge in which a random number encrypted under the key of one terminal is passed to a second terminal. The second terminal then decrypts the encrypted number using its key, generating the random number if the keys are identical. The second terminal then encrypts its key using its derivation of the random number, creating its response to the first terminal. The first terminal then determines whether the response is the encryption of its key using the random number as key. If so, it has authenticated the second terminal, otherwise communication is halted with the terminal, now identified as an alien or impostor.

The present invention has the advantageous effect of denying useful information until the terminal has been authenticated. This prevents a systematic attack from gaining sufficient information about the challenges and unacceptable responses to generate more probable responses, and ultimately to gain unauthorized access to the system.

The present invention has the further advantage that a random number generated and used in the challenge is maintained secure and available for further use in communication between the terminals. Its use as a session key could increase the security which would otherwise exist in the present secure communication system between terminals.

Other objects and advantages of the present invention will be apparent to those skilled in the art in view of the following description of the preferred embodiment, taken together with the appended claims and the accompanying drawings.

BEST MODE FOR CARRYING OUT THE INVENTION

Figure 1:
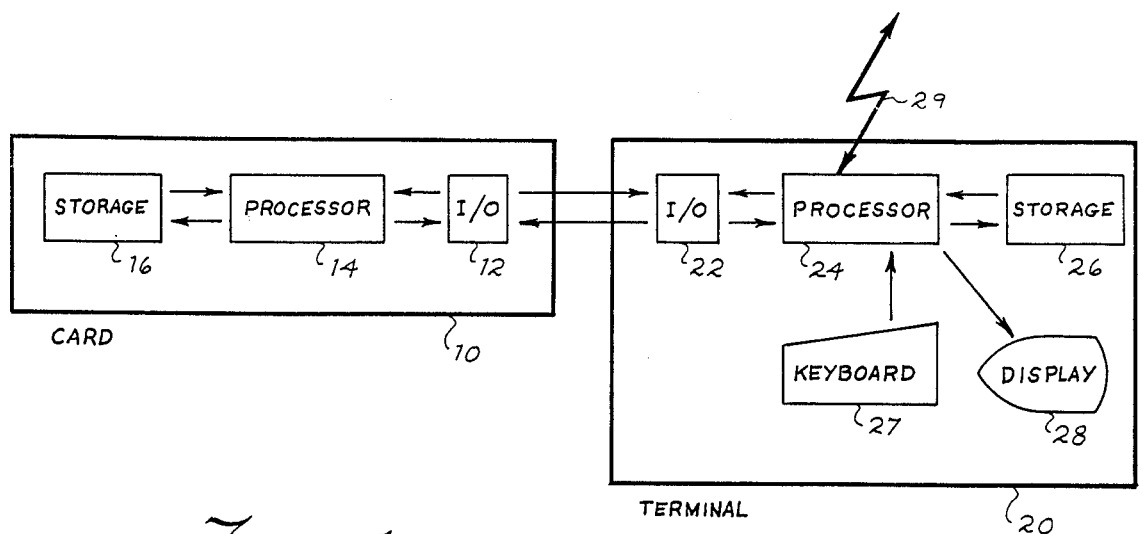
FIG. 1 is a block diagram of illustrative hardware associated with the secure component authentication system of the present invention.

FIG. 1 illustrates an environment in which the present invention has particular advantage. A card 10 is removably coupled to a terminal 20. The card 10 includes input/output elements 12 coupled to a processor 14 which in turn accesses memory 16. The terminal 20 includes input/output elements 22 coupled to a processor 24, which in turn is coupled to storage 26. Additionally, the processor 24 may be coupled to a keyboard 27, a display 28 and to an external device such as a remote host (not shown) through line 29. The card 10 is preferably a "smart" card of the type which has been previously discussed herein and is well known in the art, although security and authentication between other types of terminals is also important.

Figure 2:
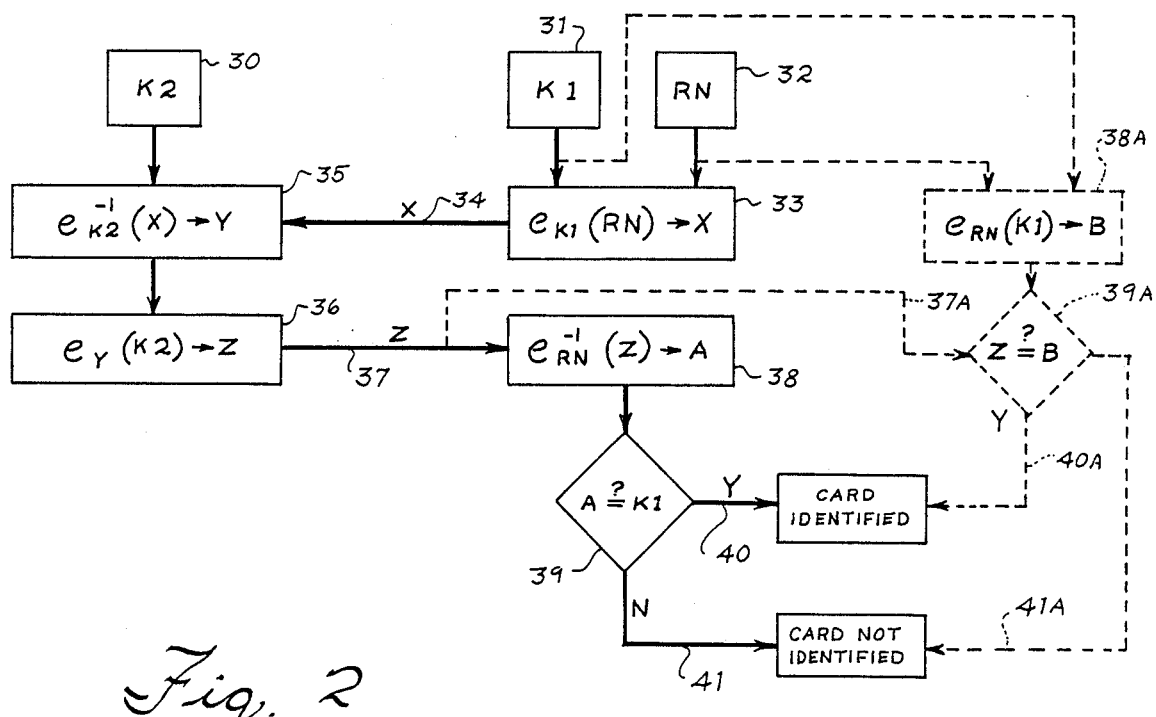
FIG. 2 is a block diagram of the processing associated with the preferred embodiment of the present invention in which components are identified without the passage of useful information.

Before any information is exchanged between the card 10 and the terminal 20, each must identify the other. During introductory activity which is referred to as "handshaking" routines, each device will verify the identity of the other. FIG. 2 illustrates a method of identifying the one device to the other, in the case shown with the terminal 20 challenging the card 10.

As shown in this FIG. 2, each of the units (the card 10 and the terminal 20) has a stored secret key, K2 shown in block 30 for the card 10 and K1 shown in block 31 for the terminal 20. Assuming that both card and terminal are authentic, the keys K1 and K2 will be the same.

A random number RN is generated at block 32 for the purpose of the challenge of the card 10. Each challenge requires the use of a new random number, of course, to avoid compromising the security as a result of tapping the lines. The random number RN is encrypted at block 33 using the key K1 to generate a value X, using an encryption scheme of a type which advantageously is both secure and irreversible such as the data encryption standard (DES) which has been adopted by various standards organizations and the U.S. Government. This value X is then transmitted to the card 10 on line 34, using whatever communications techniques have been agreed to between the units. At block 35 the value X is decrypted (as indicated by the reference $e^{-1}$) using its secret key K2 to derive a value Y. Of course, if K1 and K2 are equal, this value Y is equal to the random number. Then, at block 36, using the derived value Y as the key, the card then encrypts its secret key K2 to form a value Z which is then transmitted back to the terminal 20 on line 37. At block 38 the value Z is decrypted by the terminal 20 using the random number RN to derive a value A. Block 39 tests whether A equals the terminal's key K1. If the value A equals the key K1, then the card is identified at line 40. If A does not equal K1, then the card is not recognized (since the keys K1 and K2 must have been different) at the line 41.

An alternate embodiment for verifying the equality of keys is shown in FIG. 2 by dotted lines. At block 38A, the terminal 20 calculates a value B which is its key K1 encrypted using the random number RN as key, a process which may occur while the challenged card is processing. The calculated value B is compared with the value Z from the block 36, on line 37A at block 39A. If the values Z and B are equal (indicating that the keys K1 and K2 are equal), the card (or other terminal) is identified through line 40A. If Z is not equal to B, the keys K1 and K2 must be unequal, and the card is not identified at line 41A.

Figure 3:
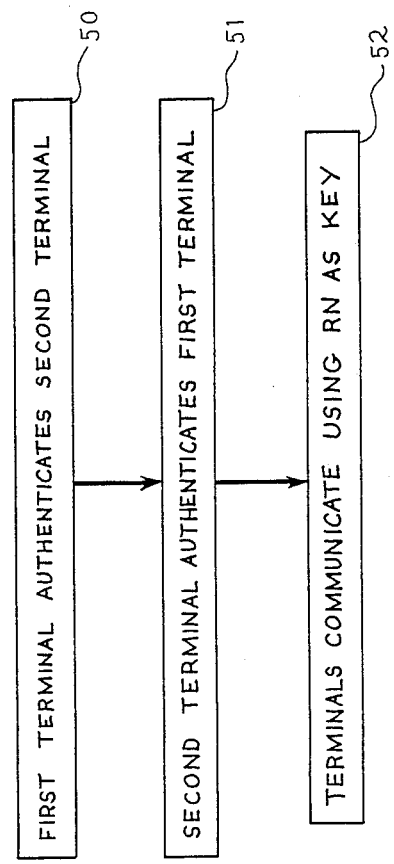
FIG. 3 illustrates a method of communication between terminals using the present invention.

After the one unit has been recognized by the other, the other is then challenged (and recognized) by the one unit so that the identification process is complete. In this case, then the card 10 has been identified by the terminal 20, then the card 10 issues a challenge to the terminal 20 to identify the terminal 20. A second random number is generated at the card and encrypted using the key K2, transmitted to the terminal 20 where it is decrypted using the key K1 to form a new value which is used as a key to encrypt the key K1 for transmission back to the card. If the decryption of the transmitted back value equals the original key, then the terminal 20 has been identified and the communication can begin. The random numbers RN can be used to advantage during later processing, e.g., as a session key. The process described in this paragraph is illustrated in FIG. 3, where, at step 50, the first terminal (e.g., the terminal 20) authenticates the second terminal (e.g., the card 10). Then, at step 51, the role of the two terminals is reversed and the second terminal authenticates the first terminal. Then, at step 51, the terminals communicate using the random number (RN) as a key.

Of course, should either identification fail, the process of transmitting ceases, to avoid compromise by disclosing information to an imposter. Since either the card 10 or the terminal 20 could be impostors, and since an impostor terminal or an imposter card present security risks for the entire system, the fact that one says that it identifies the other is insufficient to begin communication.

The discussion of the authentication occurring between terminals is an authentication of the hardware involved in the communication, and not an identification of the individual user. A separate identification of the user through known techniques such as personal identification numbers or other personal identification is also desirable in many applications. The personal identification may be accomplished one of many approaches which have been suggested in the prior art, such as fingerprint identification or signature recognition.

Many modifications of the system described in the foregoing description may be made without departing from the spirit of the present invention. Further, some features of the present invention may be used without the corresponding use of other features. While the present invention has been described in the embodiment of verification between a terminal and a card, it is equally applicable to other communications, such as between two terminals or a terminal and a host. Accordingly, the description of the best mode of carrying out the present invention should be considered as merely illustrative of the principles of the present invention and not in limitation thereof. The scope of the present invention is limited solely by the claims which follow.

Having thus described the invention, what is claimed is:

1. A method whereby a first terminal may authenticate a second terminal wherein the terminals each possess an encryption key and the second terminal is authenticated if the encryption keys are equal, the steps of the method comprising:
   generating a first number at the first terminal and creating a second number by encrypting the first number using the encryption key of the first terminal;
   transmitting the second number to the second terminal;
   generating a third number at the second terminal by decrypting the second number using the encryption key of the second terminal;
   generating a fourth number at the second terminal by encrypting the encryption key of the second terminal using the third number as the key;
   transmitting the fourth number to the first terminal; and
   verifying at said first terminal that said fourth number equals the encryption of said encryption key of said first terminal using said first number as key to thereby authenticate said second terminal.

2. A method of authenticating a terminal including the steps of claim 1 wherein the step of verifying includes the step of generating at the first terminal a fifth number which is the encryption of its encryption key using the first number as key, and comparing said fifth number with the fourth number, thereby determining said second terminal used an encryption key equal to the encryption key of said first terminal.

3. A method of authenticating a terminal including the steps of claim 1 wherein the step of verifying includes the steps of decrypting the fourth number using the first number of the first terminal to obtain a fifth value, comparing said fifth value to the first number, and authenticating the second terminal if and only if said fifth number and said first number are equal.

4. A method of authenticating a terminal including the steps of claim 1 wherein the step of generating a first number includes generating a random number.

5. A method of terminal communication including the steps of claim 4 and further including the use of the random number in communication between terminals after authentication has been completed.

6. A method of authenticating components involved in communication wherein, after the first terminal authenticates the second terminal using the steps of claim 1, the second terminal authenticates the first terminal using the role of the first terminal while the first terminal assumes the role of the second terminal.

7. A method whereby a first terminal having a first encryption key determines whether a second encryption key in a second terminal is identical to said first encryption key, the steps of the method comprising:

transmitting from said first terminal to said second terminal a first value representing the encryption of a secret value under the said first encryption key;

deriving at said second terminal a second value by decrypting said first value using said second encryption key;

transmitting from said second terminal to said first terminal a third value representing said second encryption key encrypted using the second value as key; and verifying at said first terminal that said third value is equal to the decryption of said first value using said first encryption key forming an intermediate result followed by encryption of said first encryption key using the intermediate result as an encryption key, to verify that the first and second terminal have the same keys, whereby authentication of the second terminal occurs if and only if the encryption keys used by said first and second terminals are equal.

8. A method of the type described in claim 7 wherein the intermediate result in the verifying step equals said secret value and said second value if said first and second encryption keys are equal.

9. A secure encryption system wherein a first terminal having a first encryption key challenges a second terminal having a second encryption key which responds with a response based upon the challenge, the improvement wherein the second terminal includes means for decrypting the challenge using said second encryption key and means for encrypting said second encryption key using the decrypted challenge as an encryption key to generate its response and the first terminal includes means for generating the challenge by encrypting a random number using said first encryption key, means for encrypting said first encryption key using said random number as key, and means for comparing the encrypted first encryption key to the challenge, in order to verify the response.

* * * * *